United States Patent
Wieczoreck et al.

(10) Patent No.: US 6,802,992 B1
(45) Date of Patent: *Oct. 12, 2004

(54) NON-GREEN ANTI-STOKES LUMINESCENT SUBSTANCE

(76) Inventors: Jürgen Wieczoreck, Konrad-Adenauer-Strasse 16, D-30823 Garbsen (DE); Alfred Siggel, Lärchenweg 1, D-30926 Seelze (DE); Uwe Fischbeck, Walter-Kemper-Strasse, D-31553 Sachsenhagen (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 858 days.

This patent is subject to a terminal disclaimer.

(21) Appl. No.: 09/380,181
(22) PCT Filed: Mar. 5, 1998
(86) PCT No.: PCT/EP98/01258
§ 371 (c)(1), (2), (4) Date: Nov. 8, 1999
(87) PCT Pub. No.: WO98/39392
PCT Pub. Date: Sep. 11, 1998

(30) Foreign Application Priority Data

Mar. 5, 1997 (DE) ......................... 197 08 959

(51) Int. Cl.[7] ................. C09D 5/22; G06K 19/14
(52) U.S. Cl. ................. 252/301.45; 106/31.32; 106/31.64; 106/31.14; 106/31.15
(58) Field of Search ............... 252/301.45, 301.4 R; 106/31.32, 31.64, 31.14, 31.15

(56) References Cited

U.S. PATENT DOCUMENTS

| | | | |
|---|---|---|---|
| 3,659,136 A | * | 4/1972 | Grodkiewicz et al. ............... 252/301.4 H |
| 4,047,033 A | * | 9/1977 | Malmberg et al. ............ 250/431 |
| 5,674,698 A | * | 10/1997 | Zarling et al. ............... 435/7.92 |

FOREIGN PATENT DOCUMENTS

| AT | 286468 | 12/1970 |
|---|---|---|
| DE | 2158313 | 11/1971 |
| EP | 410350 A2 | 7/1990 |
| EP | 530807 A1 | 9/1992 |
| GB | 2 258 659 | 2/1993 |
| GB | 2 258 660 | 2/1993 |

OTHER PUBLICATIONS

Database WPI, Section Ch, Week 7502, Derwent Publications Ltd., london, GB; Class L03, AN 75-02850W, XP002068057, & JP 49 045 990 B (Tokyo Shibaura Electric Co.).

Kuroda, Shionoya and Kushida, "Mechanism and Controlling Factors of Infrared–to–Visible Conversion Process in Er 3+ and Yb3+–Doped Phosphors", Journal of the Physical Society of Japan, vol. 33, No. 1 (Jul., 1972), pp. 125–141.

* cited by examiner

Primary Examiner—C. Melissa Koslow
(74) Attorney, Agent, or Firm—Colleen Szuch

(57) ABSTRACT

Non-green anti-Stokes luminescent material, comprising the elements Ln, erbium (Er) and ytterbium (Yb), Ln representing at least one element which is selected from the group consisting of yttrium (Y), gadolinium (Gd), scandium (Sc) and lanthanum (La), a process for its production and its use.

14 Claims, 4 Drawing Sheets

Red emission colour

Yellow emission colour

NON-GREEN ANTI-STOKES LUMINESCENT SUBSTANCE

Figure 1:
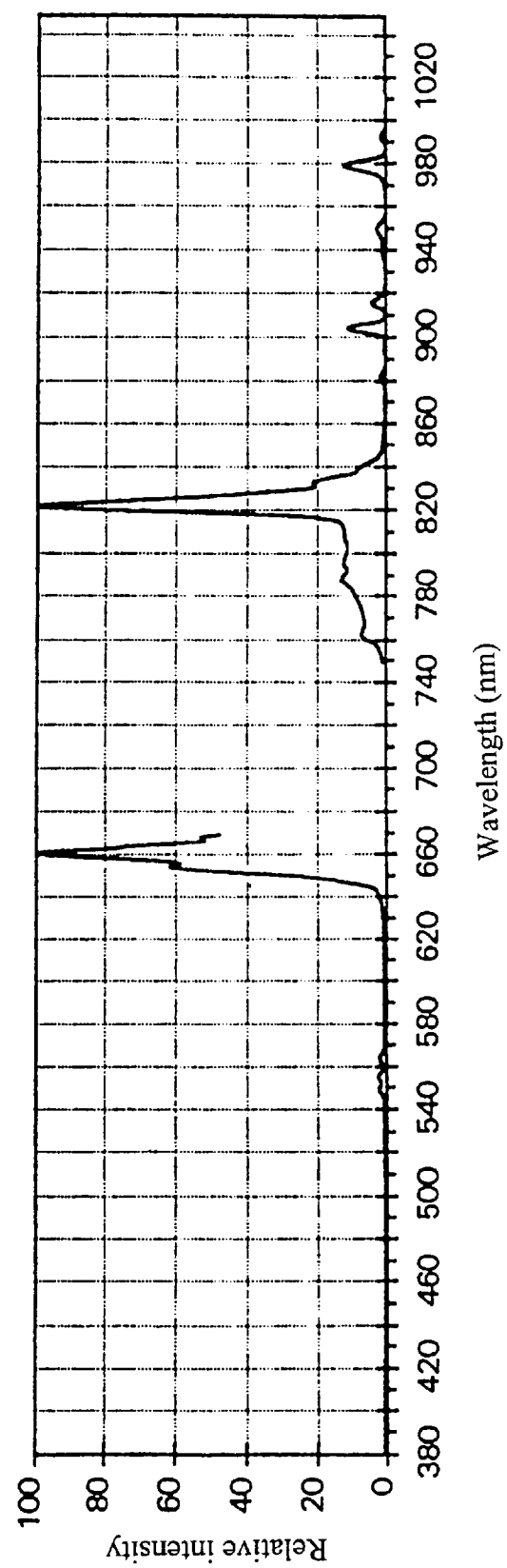

The present invention relates to a non-green anti-Stokes luminescent material, to a process for its production and to its use.

Luminescent materials which are capable of emitting in the visible light range when excited with infrared (IR) radiation are known, and are for example used in IR sensor cards for detection and positioning of IR lasers. Depending on the composition of the active lattices and of the dopants used, these materials briefly emit red, green or blue-green light when stimulated with IR radiation. A disadvantage with these materials is the fact that, using IR radiation, only energy stored beforehand—for example by excitation with visible light—is extracted. For IR detection, it is therefore in each case necessary to charge the materials. During continuous IR stimulation, the stored energy furthermore becomes used up, so that the emission of visible light falls off even after an extremely short time and, in the end, ceases. Continuous emission of visible light under IR radiation is therefore not possible with these IR-stimulable materials. Such luminescent materials based on ZnS:Cu,Co; Ca:Sm,Ce or SrS:Sm,Ce are described, for example, in Ullmann's Encyclopedia of Industrial Chemistry, vol. A15, "Luminescent Materials", 1990.

On the other hand, infrared-to-visible up-conversion materials, or anti-Stokes luminescent materials, are known which convert IR radiation into visible light without prior charging. These materials use multiphoton excitation of active lattices with dopants from the rare earth metal group, in particular erbium in combination with ytterbium, in order to generate more energetic photons, and therefore visible light, from a plurality of low-energy infrared photons. Materials based on fluorides are known, for example $YF_3$: Er, Yb which is described by H. Kuroda et al., J. Phys. Soc. Jpn., vol. 33, 1, pp. 125–141 (1972). Disadvantages with these active lattices are that they are often difficult to produce with the exclusion of oxygen and that there is a tendency, depending on the composition of the active lattice, to instability in practical application, for example in application at high temperatures.

Luminescent materials of the stoichiometric composition $Y_l Yb_m Er_n O_2 S$ with $(l+m+n)=2$ are, for example, more favourable. Such luminescent materials, or more generally oxysulphides of the general composition $Ln_2 O_2 S$, Ln standing for the elements Y, Gd, Sc and/or La, which are doped with ytterbium and erbium, are highly stable with respect to organic solvents, alkalis, hot water, heat and atmospheric moisture, and are only slowly dissolved by acids. Such luminescent materials based on active lattices of stoichiometric composition $Ln_l Yb_m Er_n O_2 S$ with $(l+m+n)=2$, that is to say a ratio of rare earth metals to oxygen to sulphur of 2:2:1 are usually produced by reacting the rare earth metal oxides with alkali metal carbonate and sulphur. On heating, reactions then take place that form alkali metal polysulphides which, in situ or else only when the maximum temperature is reached, have a sulphurating effect on the rare earth metal oxides and lead to the formation of the oxysulphides. Furthermore, only water-soluble compounds remain in the reaction mixture, so that by using known process measures such as leaching and heating with water, washing with acid or alkali, disaggregation or grinding, for example in a ball mill, the reaction product can be subsequently converted on heating to high temperatures in order to reduce the proportion of crystal defects, into the desired oxysulphide with the stoichiometric composition defined above.

When producing such oxysulphides, the proportion of polysulphide—as for example described in Austrian patent 286 468—is adjusted in such a way that the amount of polysulphide is more than the amount needed for converting all the oxides into oxysulphides. The ratio of rare earth metals to sodium carbonate to sulphur is adjusted in such a way that, as for example described in European patent application EP-A 0 410 350, pure-phase products with the aforementioned stoichiometric composition of the oxysulphides result. According to patent 286 468 luminescent materials of the formula $M'_{(2-x)} M''_x O_2 S$ are formed, M' standing for at least one element from the group Y, Gd and La, M" for at least one element from the lanthanoid group with atomic number between 57 and 64 or between 64 and 71, and x being a number less than 0.2 and more than 0.0002. By way of example, this application describes the rare earth metal combinations Y and Th, Y and Eu, La and Eu, and Y and Er, which in the case of the combination Y or La and Eu represent luminescent materials with red emission, and for Y and Er and Y and Tb green luminescence.

EP-A 530 807 describes luminescent materials of the formula $(Ln_{1-x-y} La_x Ln'_y)_2 O_2 S$, in which Ln is at least one element selected from the group consisting of Y, Gd, Sc and Lu, Ln' is at least one element selected from among Eu, Th, Sm, Er, Tm, Dy, Ho, Nd and Pr, and x and y represent values in the range $0.005 \leq x \leq 0.07$ and $0.0001 \leq y \leq 0.2$. As examples, luminescent materials comprising Y, La and Eu (luminescent material with red emission), Gd, La and Th (luminescent material with green emission) and a luminescent material comprising Y, La and Eu (luminescent material with red emission) are described therein.

GB-B 2 258 659 and GB 2 258 660 describe anti-Stokes luminescent materials based on doped yttrium oxysulphide, which are doped with 4 to 50% by weight Er and/or Yb and 1 to 50 ppm of one or more other lanthanoid elements. Regarding these materials, it is mentioned that they have green luminescence.

Such materials are also described in DE-A 21 58 313.

The materials described above have either anti-Stokes behaviour and green luminescence or non-green luminescence but no anti-Stokes behaviour.

The object of the present invention, in view of the prior art referred to above, is to provide a non-green luminescent material with anti-Stokes behaviour, which is straightforward to produce using standard methods and in departure from hitherto known luminescent materials, has a different luminescence colour.

It was surprisingly found in this regard that it is possible with the system Ln-O-S-Er-Yb with Ln=Y, Gd, Sc or La, to obtain anti-Stokes luminescent materials which have further non-green luminescence colours under IR excitation.

Accordingly, the present invention relates to a non-green anti-Stokes luminescent material, comprising the elements Ln, erbium (Er) and ytterbium (Yb), Ln representing at least one element which is selected from the group consisting of yttrium (Y), gadolinium (Gd), scandium (Sc) and lanthanum (La).

In another embodiment, the present invention provides a luminescent material which comprises a composition $Ln_x Yb_y Er_z O_a S_b$, where Ln is defined as above, the sum of $(x+y+z)$ is 2 and the sum of $(a+b) \leq 3$ and $b<1$.

The luminescent material here is preferably a luminescent material which has non-green emission on excitation by IR radiation in the wavelength range of approximately 900 to 1100 nm.

The luminescent materials according to the invention can, for example, be used for the detection and positioning of IR-emitting systems, such as for example lasers, laser diodes and LEDs. Compared with other, for example electrical IR detection systems with IR-sensitive photodiodes, IR-excitable materials offer the advantage for this application of simple, visual and cost-effective detection of IR radiation.

Through a combination with a suitable excitation source, such a luminescent material may also be used for the security coding of products and for verifying the originality of valuable and security documents. In this context, it is important to use materials and security features which are very difficult to forge and can be produced in combination with other security features. Besides simple checking by any individual, it is also desirable for the corresponding security features, depending on the security level, to be unambiguously verified analytically as well, or exclusively, in case of doubt The present invention accordingly also relates to a printing ink which comprises at least one of the luminescent materials described here. Such a printing ink can, for example, be used in the production of bank-notes.

The present invention furthermore relates to an object, for example a security document such as, for example, an identity card, passport, driving licence or operating or import licence, a banknote, shares or other securities, travel, flight and lottery tickets, credit cards and cheque guarantee cards made of plastic, traveller's and bank cheques, etc., which respectively comprise the luminescent material according to the invention.

In terms of the applications described above, the luminescent material according to the invention offers great advantages in simple, quick, non-contact and cost-effective checking, machine readability, combinability with other effects, controlled excitation by different IR wavelengths and different luminescence colours on excitation with different IR wavelengths.

The luminescent materials according to the invention are furthermore suitable for the production of uncopiable inks, and can be printed using a variety of printing processes, for example steel-plate and offset printing, which provides the possibility of combination with other security inks or combination with other security features.

The term "non-green", as used in the context of the present application, comprises all radiations which do not appear green to an observer, such as for example white, dark red, bright red, pink, yellow, orange and colours formed by mixing these colours.

This being the case, it is characteristic of the luminescent materials according to the invention that they have a primary maximum for visible emission in the range of approximately 650 to approximately 680 nm, in particular at approximately 660 to approximately 670 nm.

This being the case, the luminescent materials according to the invention generally exhibit, in the emission spectrum, both green emissions in the range of approximately 530 to approximately 560 nm, and also emissions in the above-mentioned red wavelength range. It is, however, also possible to produce luminescent materials according to the invention which exhibit no emissions at all in the green wavelength range.

In general, the ratio of the relative peak heights between the emission in the red wavelength range and the emission in the green wavelength range is 1 (red peak height): approximately 0.001 to approximately 0.8 (green peak height), preferably 1: approximately 0.005 to approximately 0.6 and especially 1:0.01 to approximately 0.6. It is, however, also possible according to the invention to obtain luminescent materials which exhibit no emission in the green wavelength range.

As defined above, the luminescent material according to the invention comprises at least one element Ln which is selected from the group consisting of Y, Gd, Sc and La, Y and Gd being preferred, as well as erbium and ytterbium as activators.

The sum of the relative proportions of the elements Ln (x+y+z) is preferably 2, the ratio x:y:z generally lying in the range of approximately $1.5<x<1.9:0.08<y<0.3:0.08<z<0.3$, more preferably approximately $1.6<x<1.8:0.1<y<0.25:0.1<z<0.25$ and especially $1.65<x<1.75:0.12<y<0.2:0.12<z<0.2$.

According to the above-defined further embodiment of the invention, it is, however, essential that $b<1$, the values for b preferably satisfying the relationship $0.001 \leq b \leq 0.999$, more preferably the relationship $0.001 \leq b \leq 0.9$ and especially the relationship $0.01 \leq b \leq 0.7$.

As can be seen from above, the present invention also comprises luminescent materials of the above-described type which are virtually free of sulphur, although these have relatively low brightness.

In a further embodiment of the present invention, the latter relates to a luminescent material, as defined above, which additionally comprises from approximately 1 ppm to approximately 0.1% by weight, preferably approximately 1 to approximately 50 ppm and especially approximately 2 to approximately 20 ppm, in each case relative to the sum of the rare earth oxides, of at least one further lanthanoid element. Examples of further lanthanoid elements which may be mentioned include Eu, Th, Tm, Dy, Nd, Ce, Sm, Pr, Ho and Sm.

The present invention also furthermore relates to a process for producing a luminescent material as defined above, which comprises the following step I:

(I) sintering a mixture containing:
an oxide, or a compound capable of being decomposed under sintering conditions, or a mixture of two or more thereof, of at least one of the elements La, Y, Gd and Sc,
an oxide, a compound capable of being decomposed under sintering conditions, or a mixture of two or more thereof, of the element Yb,
an oxide, a compound capable of being decomposed under sintering conditions, or a mixture of two or more thereof, of the element Er, and
an alkali metal polysulphide or an alkaline earth metal sulphide or a mixture of two or more thereof, the amount of sulphide or polysulphide present or of the mixture of two or more thereof not being sufficient to produce a stoichiometric oxysulphide of the composition $Ln_xYb_yEr_zO_aS_b$, with $(x+y+z)=2$ and $a=2$ and $b=1$, as well as to a non-green anti-Stokes luminescent material, comprising the elements Ln, Er and Yb, Ln representing at least one element which is selected from the group consisting of Y, Gd, Sc and La, obtainable by a process which comprises the following step I:

(I) sintering a mixture containing:
an oxide, or a compound capable of being decomposed under sintering conditions, or a mixture of two or more thereof, of at least one of the elements La, Y, Gd and Sc,
an oxide, a compound capable of being decomposed under sintering conditions, or a mixture of two or more thereof of the element Yb,
an oxide, a compound capable of being decomposed under sintering conditions, or a mixture of two or more thereof, of the element Er, and an alkali metal polysulphide or an alkaline earth metal sulphide or a mixture of two or more thereof,
the amount of sulphide or polysulphide present or of the mixture of two or more thereof not being sufficient to produce a stoichiometric oxysulphide of the composition $Ln_xYb_yEr_zO_aS_b$ with $(x+y+z)=2$ and $a=2$ and $b=1$.

Preferably, in the scope of the process defined above, the alkali metal polysulphide or the alkaline earth metal sulphide or the mixture of two or more thereof is formed in situ during the sintering.

When carrying out the process defined above, it is essential that the amount of sulphide and/or polysulphide present is not sufficient to produce a stoichiometric oxysulphide with $(x+y+z)=2$ and $(a+b)=3$ with $a=2$ and $b\times1$, x, y, z, a and b having the meaning defined above.

This being the case, in the scope of the process according to the invention, on the one hand alkali metal or alkaline earth metal sulphides may be used per se together with the oxides of the rare earth metals present in the luminescent material according to the invention, or these may be formed in situ in the form of the alkali metal polysulphide or of the alkaline earth metal sulphide or as a mixture of two or more thereof during the sintering, for example by a reaction between an alkali metal or alkaline earth metal carbonate, such as for example $Na_2CO_3$, $K_2CO_3$, $MgCO_3$, $CaCO_3$ or $BaCO_3$ with elemental sulphur.

This being the case, the ratio (w/w) between the total amount of alkali metal and/or alkaline earth metal carbonates used and of sulphur is generally 1:<0.6, preferably 1: approximately 0.05 to approximately 0.5, more preferably 1: approximately 0.1 to approximately 0.4.

The further parameters of the production process according to the present invention are known per se, and are for example described in GB-B 2 258 659 and GB-B 2 258 660, as well as DE-A 21 58 313. A few details of the process according to the invention, and of the process conditions preferably employed in the scope of this process, will be further explained below.

The starting compounds used for producing the luminescent material according to the invention are primarily the oxides, preferably yttrium oxide, ytterbium oxide and erbium oxide. Furthermore, as defined above, it is also possible to use other decomposable compounds of the above-defined rare earth metals, it being possible for these to replace the rare earth metal oxides fully or partially. In this regard, in particular, the sulphates and oxalates of the abovementioned rare earth metals may be mentioned.

Before the actual sintering, the starting compounds are mixed or ground with one another, optionally together with water and/or the alkali metal or alkaline earth metal compounds and/or sulphur, fine grinding being preferred in this case. If fine grinding is being carried out in the presence of water, the slurry or rare earth metal compounds obtained in this way is filtered and the rare earth metal compounds obtained are dried and subsequently screened.

As the alkali metal and/or alkaline earth metal compounds, it is in principle possible to use all compounds of the above type which are capable, in the presence of elemental sulphur and/or a rare earth metal sulphate, of forming a (poly)sulphide on sintering. A preferred component used in this case is sodium carbonate, which is outstandingly capable, together with elemental sulphur, of forming sodium polysulphide, the latter subsequently reacting with the rare earth metal compounds used, preferably oxides, to form the luminescent material according to the invention.

The following may be used as alternative or further reaction components: other sodium compounds, such as for example sodium hydroxide, sodium oxide, sodium acetate, sodium sulphide or sodium sulphite, mixtures thereof or hydroxides, oxides, acetates, sulphides or sulphites of other alkali metals, such as for example potassium or lithium, or of alkaline earth metals, such as for example magnesium, barium or calcium. The abovementioned compounds can, of course, also be used as a mixture of two or more thereof.

Fluorides, such as for example sodium, potassium or ammonium fluoride, may furthermore also be added to the mixture which is subsequently sintered, experimental results having shown that luminescent materials which are sintered in the presence of such a fluoride have brighter and therefore stronger-intensity emission of visible light.

As further additives, inter alia to control the obtained particle size of the luminescent material, additions of an alkali metal or alkaline earth metal phosphate, an alkali metal or alkaline earth metal borate or a compound which, under reaction conditions, forms a corresponding phosphate or borate, or mixtures of two or more thereof, may in particular be added. As shown below in Examples 25 to 28, both these additions and also the sintering temperature and the duration of the sintering process have an effect on the average particle size of the luminescent material obtained.

This being so, in the present case care should be taken that the average particle size of the luminescent material according to the invention is approximately 50 $\mu$m or less, preferably 30 $\mu$m or less, more preferably 20 $\mu$m or less and, in particular, 10 $\mu$m or less, the lower limit for the average particle size being generally 0.2 $\mu$m, preferably 1.0 $\mu$m.

In terms of the shape of the luminescent particles obtained, there are no restrictions whatsoever, that is to say they may be in the form of needles, platelets, double pyramids, octahedra, tetrahedra, prisms and spherical particles; spherical particles, double pyramids and octahedra being preferred.

In terms of the sintering time, there are in principle no restrictions, so long as this time is sufficient to form an anti-Stokes material from the mixture used according to the invention. The reaction time is generally between 10 minutes and approximately 10 hours, preferably between approximately 0.5 to approximately 6 hours, more preferably approximately 2 to approximately 4 hours.

The sintering temperature is, of course, above the reaction temperature of the mixtures used. It is generally between approximately 800 and approximately 1500° C., preferably between approximately 900 and approximately 1300° C., and in particular between approximately 1000 and approximately 1200° C.

Besides the compounds already mentioned above, the luminescent material according to the invention may, in particular, be used as a component of a printing ink. For this application, the average particle size of the luminescent material according to the invention is 30 $\mu$m or less, preferably between approximately 2 $\mu$m and approximately 30 $\mu$m.

Accordingly, the present invention also relates to a printing ink which comprises the luminescent material defined above. The printing ink according to the invention furthermore comprises conventional components, such as for example a dye or a vehicle. For example, the printing ink may be intimately mixed by intimately mixing an extender, a wax, the luminescent material and further additives, such as for example a lustre agent, a levelling agent and an antioxidant or mixtures of two or more thereof together with resinous components, examples being the abovementioned vehicle, and a solvent, such as for example a hydrocarbon or an aqueous medium, and subsequently dispersed.

For the use of the materials according to the invention, extensive application to a substrate is preferably necessary. This application may be carried out using various applying processes, such as for example electrophoresis, photolithography, applying in a binder or primer, but preferably by various printing techniques, such as for example screen printing, flat-bed printing, steel-plate impression or offset printing.

The object, in particular the security document, according to the present invention can be authenticated by exposure to IR radiation and observing the light thereupon emitted in the visible range. In this case, customary irradiation devices, such as for example a gas laser, which emits in the near IR range, a laser diode or an IR-emitting diode may be used. In this case, in particular, IR radiation in the wavelength ranges of approximately 900 to approximately 1100 as well as approximately 1500 to approximately 1600 nm are preferred for the excitation.

Accordingly, the present invention also relates to a process for authenticating an object as defined above, which comprises:

exposing the object to IR radiation and observing the light then emitted, in the visible range.

The invention will now be explained in more detail with reference to the examples below.

Figure 2:
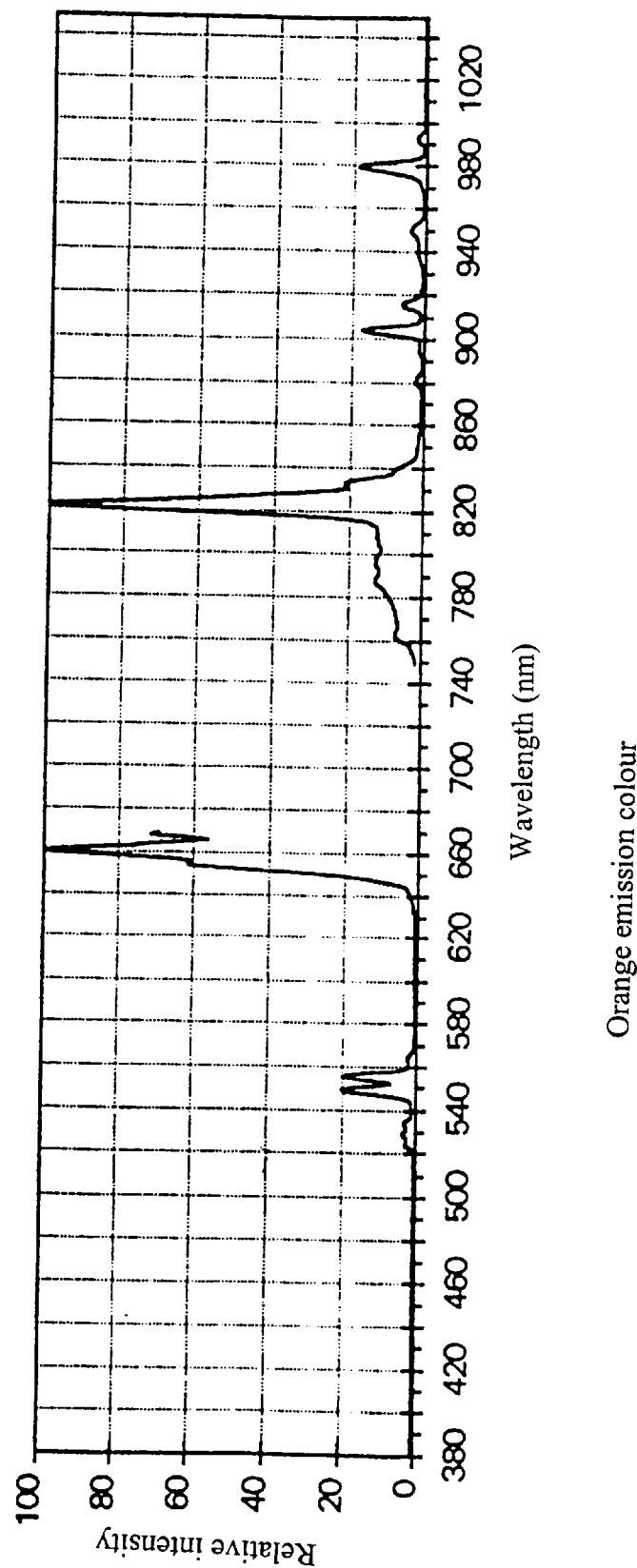
Figure 3:
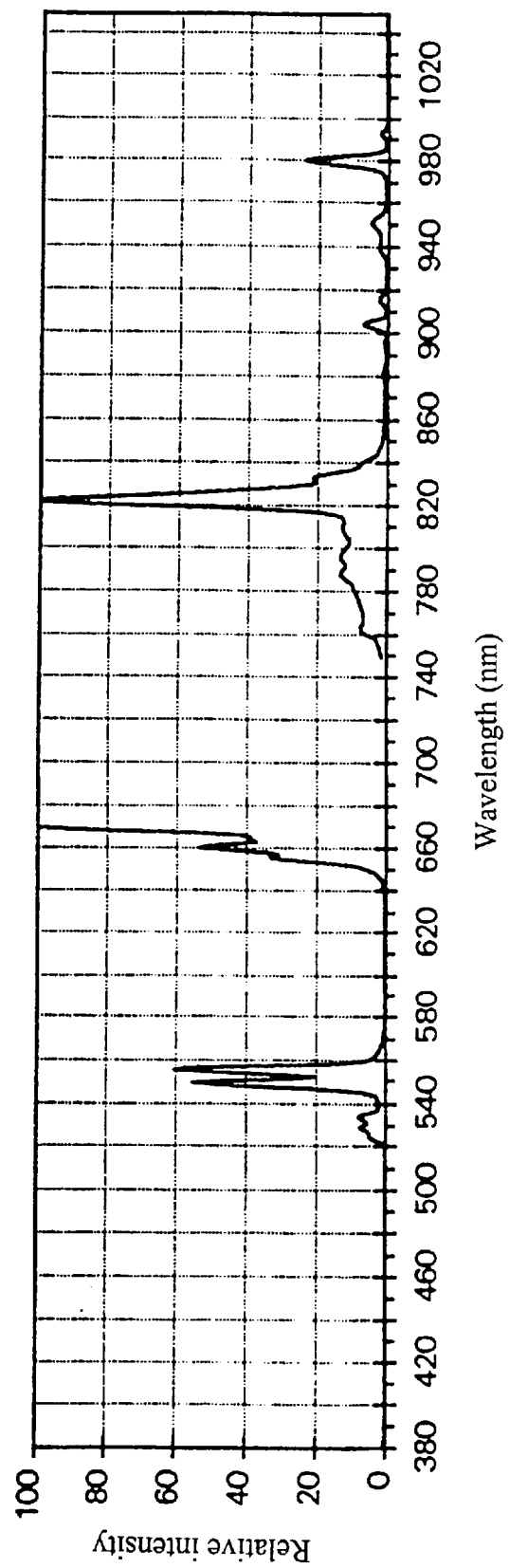
Figure 4:
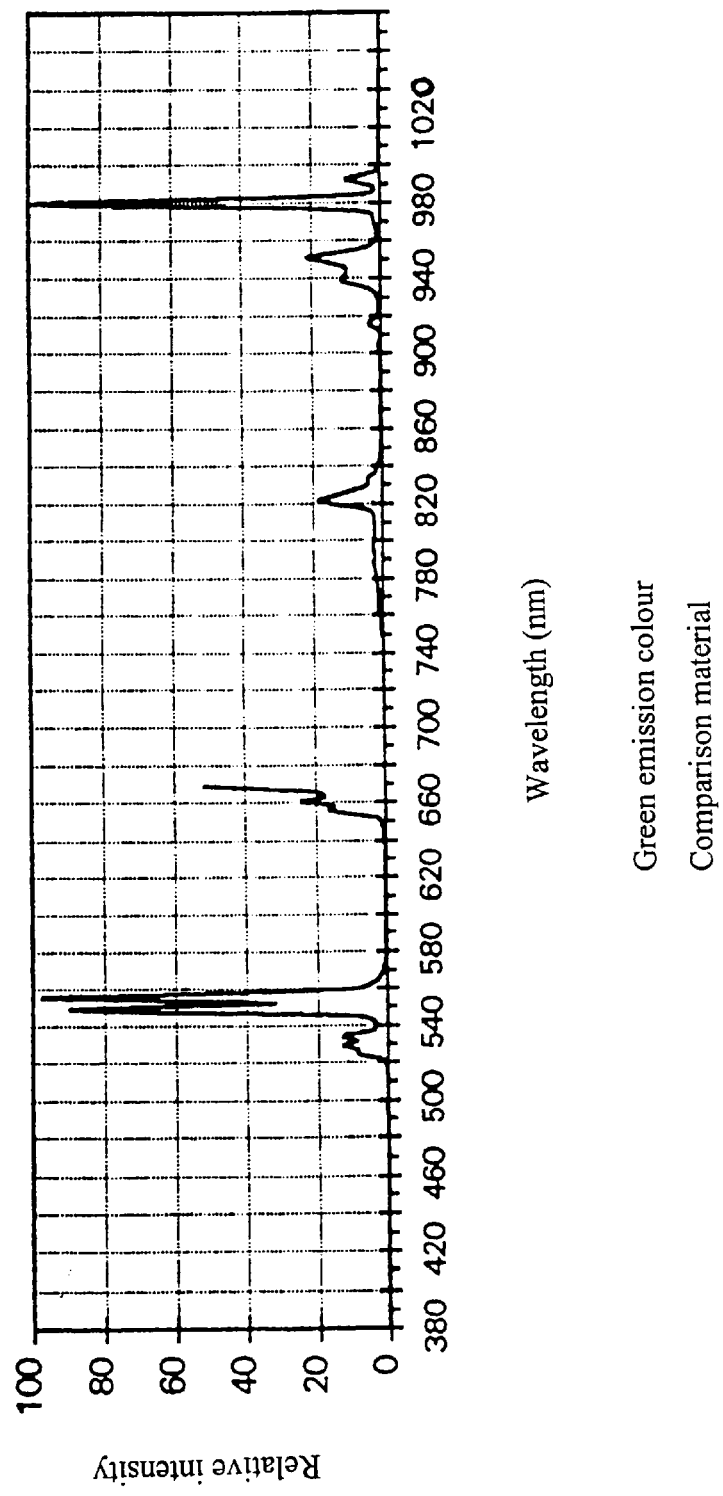

FIG. 1 shows the excitation and emission spectrum of the luminescent material according to Example 3, FIG. 2 shows the excitation and emission spectrum of the luminescent material according to Example 10, FIG. 3 shows the excitation and emission spectrum of the luminescent material according to Example 12, and FIG. 4 shows the excitation and emission spectrum of the luminescent material according to Example 19 (comparison).

EXAMPLES

Examples 1 to 19

Firstly, in the system Y-O-S-Er-Yb, the production conditions for a luminescent material of the composition $Y_xYb_yEr_zO_2S_b$ with (x+y+z=2) and b<1 were investigated. To that end, mixtures of $Y_2O_3$, $Yb_2O_3$ and $Er_2O_3$ were mixed dry in the amounts indicated in Table 1 with sodium carbonate and sulphur in the proportions mentioned in Table 1, and the ratio of sodium carbonate to the sum of the rare earth metal oxides varies in this case from 1.50:1 to 0.5:1 and the ratio of sulphur to the sum of the rare earth metal oxides from 1.275:1 to 0.1:1. The mixtures were placed in an aluminium oxide crucible and annealed at 1100° C. for 3 hours. After cooling to room temperature, the annealed products were removed from the crucible, agitated in water and repeatedly washed with hot water, dilute hydrochloric acid and sodium hydroxide solution.

The suspensions obtained were then disaggregated by grinding in a ball mill, the solids ere separated from the water by filtration and dried at 120° C. for 10 hours.

The results are shown in Table 1.

TABLE 1

| Example No. | Proportion of $Na_2CO_3$ [g] | Proportion of sulphur [g] | $Y_2O_3$ + $Yb_2O_3$ + $Er_2O_3$ [g] |
|---|---|---|---|
| 1 | 127.5 | 10 | 71 g $Y_2O_3$ + 14 g $Yb_2O_3$ + 15 g $Er_2O_3$ |
| 2 | 127.5 | 20 | see Ex. 1 |
| 3 | 127.5 | 30 | see Ex. 1 |
| 4 | 127.5 | 40 | see Ex. 1 |
| 5 | 80 | 20 | see Ex. 1 |
| 6 | 80 | 30 | see Ex. 1 |
| 7 | 140 | 20 | see Ex. 1 |
| 8 | 140 | 40 | see Ex. 1 |
| 9 | 150 | 30 | see Ex. 1 |
| 10 | 127.5 | 50 | see Ex. 1 |
| 11 | 110 | 40 | see Ex. 1 |
| 12 | 127.5 | 60 | see Ex. 1 |
| 13 | 80 | 40 | see Ex. 1 |
| 14 | 50 | 30 | see Ex. 1 |
| 15* | 127.5 | 70 | |
| 16* | 50 | 50 | |
| 17* | 70 | 50 | |
| 18* | 50 | 30 | |
| 19* | 127.5 | 127.5 | see Ex. 1 |

The examples marked "*" are comparative examples.

The luminescent materials according to Examples 1 to 9, that is to say under conditions which were not sufficient to convert all the oxides completely into oxysulphides, were light pink-coloured powders with deep-red luminescent colour on excitation with IR radiation.

FIG. 1 shows the excitation and emission spectrum of the luminescent material according to Example 3.

Under reaction conditions which—compared with Examples 1 to 9—start with higher sulphur or lower sodium carbonate proportions, but were not sufficient to convert all the oxides completely into oxysulphides, Examples 10 and 11 gave light pink-coloured powder with orange-coloured luminescence on excition with IR radiation. FIG. 2 shows the excitation and emission spectrum of the materials according to Example 10.

Examples 12 to 14, in which even higher sulphur or even lower sodium carbonate proportions were used, gave light pink-coloured powders with yellow luminescence on excitation with IR radiation. FIG. 3 shows the excitation and emission spectrum of the luminescent material according to Example 12.

For comparative purposes, the luminescent materials according to Examples 15 to 19 were produced as comparative examples under—apart from the variations in the amounts of sodium carbonate and sulphur mentioned in Table 1—the same preparation conditions. These examples gave light pink-coloured powder with green luminescence on excitation with IR radiation. To illustrate the difference from the luminescent materials according to the invention, FIG. 4 shows the excitation and emission spectrum of the luminescent material according to Example 19, which is an oxysulphide with stoichiometric composition.

Examples 20 to 24

In the scope of these examples, the alkali metal or alkaline earth metal compounds listed in Table 2 were used as reaction components instead of sodium carbonate under otherwise the same reaction conditions as in Examples 1 to 19.

All the examples resulted in light pink-coloured powder with red luminescence on excitation with IR radiation.

TABLE 2

| Example No. | Alkali metal compound [g] | Proportion of sulphur [g] | $Y_2O_3 + Yb_2O_3 + Er_2O_3$ [g] |
|---|---|---|---|
| 20 | 96 g NaOH | 40 | see Tab. 1 |
| 21 | 75 g $Na_2O$ | 40 | see Tab. 1 |
| 22 | 197 g sodium acetate | 40 | see Tab. 1 |
| 23 | 89 g $Li_2CO_3$ | 40 | see Tab. 1 |
| 24 | 166 g $K_2CO_3$ | 40 | see Tab. 1 |

Examples 25 to 28

The following examples show the effect of one or more additives as well as the reaction temperature and time on the average particle size of the luminescent material obtained, it being possible for the average particle size to be significantly affected, that is to say increased or reduced, depending on the type and amount of additive and the process conditions, in particular the sintering temperature and time. Apart from the varied reaction parameters shown in Table 3, these examples were performed in similar fashion to Example 3 discussed above. All the examples were light pink-coloured powder with red luminescent on excitation with IR radiation.

The average particle size shown in Table 3 was determined by means of laser dispersion analysis.

TABLE 3

| Example No. | Reaction temperature [° C.] | Reaction time [h] | Additions | Average particle size [µm] |
|---|---|---|---|---|
| 25 | 950 | 1 | — | 2 |
| 26 | 1300 | 4 | — | 11 |
| 27 | 1100 | 4 | $Li_2CO_3$ instead of $Na_2CO_3$ | 17 |
| 28 | 1300 | 4 | $Li_2CO_3$ instead of $Na_2CO_3$ | 38 |

What is claimed is:

1. Non-green anti-Stokes luminescent material, comprising the elements Ln, erbium (Er) and ytterbium (Yb), Ln representing at least one element which is selected from the group consisting of yttrium (Y), gadolinium (Gd), scandium (Sc) and lanthanum (La), said elements being present according to the formula $Ln_xYb_yEr_zO_aS_b$, wherein: the sum of (x+y+z) is 2, the sum of (a+b)≦3, b<1 and x, y and z are stoichiometric factors defined as 1.5<x<1.9, 0.08<y<0.3, and 0.08<z<0.3.

2. Luminescent material according to claim 1, with a ≧2 and the values for b satisfying the relationship 0.001≦b≦0.999.

3. A. Luminescent material according to claim 1, which additionally comprises from 1 ppm to 0.1% by weight of at least one further lanthanoid element.

4. A process for producing a luminescent material, which comprises the following step (I):

(I) sintering a mixture containing:
   an oxide, or a compound capable of being decomposed under sintering conditions, or a mixture of two or more thereof, of at least one of the elements La, Y, Gd and Sc,
   an oxide, a compound capable of being decomposed under sintering conditions, or a mixture of two or more thereof, of the element Yb,
   an oxide, a compound capable of being decomposed under sintering conditions, or a mixture of two or more thereof, of the element Er,
   and an alkali metal polysulphide or an alkaline earth metal sulphide or a mixture of alkali or alkaline earth compound and sulphur capable of forming, in situ under sintering conditions, an alkali metal polysulfide or an alkaline earth methal sulfide or a mixture of two or more thereof,
   said sintering step being conducted under conditioins sufficient to produce a non-green anti-Stokes luminescent material comprising the elements Ln, erbium (Er) and ytterbium (Yb), Ln representing at least one element which is selected from the group consisting of yttrium (Y), gadolinium (Gd), scandium (Sc) and lanthanum (La),
   wherein the amount of sulphide or polysulphide present or of the mixture of two or more thereof not being sufficient to produce a stoichiometric oxysulphide of the composition $Ln_xYb_yEr_zO_2S_1$ with (x+y+z)=2.

5. Process according to claim 4, the alkali metal polysulphide or the alkaline earth metal sulphide or the mixture of two or more thereof being formed in situ during the sintering.

6. Printing ink comprising at least one luminescent material according to claim 1.

7. Object comprising at least one luminescent material according to claim 1.

8. Process for authenticating an object according to claim 7, which comprises:

exposing the object to IR radiation and observing the light then emitted.

9. Printing ink comprising at least one luminescent material produced using a method according to claim 4.

10. Object comprising at least one luminescent material produced using a method according to claim 4.

11. Process for authenticating an object according to claim 10, which comprises exposing the object to IR radiation and observing the light then emitted.

12. The non-green anti-Stokes luminescent material of claim 1 wherein x, y and z are defined as 1.6<x<1.8, 0.1<y<0.25, and 0.1<z<0.25.

13. The non-green anti-Stokes luminescent material of claim 12 wherein x, y and z are defined as 1.65<x<1.75, 0.12<y<0.2, and 0.12<z<0.2.

14. A non-green anti-Stokes luminescent material comprising the elements Ln, erbium (Er) and ytterbium (Yb), Ln representing at least one element which is selected from the group consisting of yttrium (Y), gadolinium (Gd), scandium (Sc) and lanthanum (La), said elements being present according to the formula $Ln_xYb_yEr_zO_aS_b$, wherein: (1) each variable x, y and z is non-zero; (2) the sum of x+y+z=2; and (3) the sum of (a+b) ≦3 and b<1.

* * * * *